(12) United States Patent
Kim et al.

(10) Patent No.: US 11,807,046 B2
(45) Date of Patent: Nov. 7, 2023

(54) TIRE WEAR MEASUREMENT DEVICE USING ACCELERATION PEAK VALUE OF TIRE AND TIRE WEAR MEASUREMENT METHOD USING SAME

(71) Applicants: Hankook Tire & Technology Co., Ltd., Seongnam-si (KR); Korea Advanced Institute of Science and Technology, Daejeon (KR)

(72) Inventors: Min Tae Kim, Daejeon (KR); Ho Jong Lee, Daejeon (KR); Sei Bum Choi, Daejeon (KR); Da Sol Jeong, Seoul (KR); Jong Hyup Lee, Uijeongbu-si (KR)

(73) Assignees: Hankook Tire & Technology Co., Ltd., Seongnam-si (KR); Korea Advanced Institute of Science and Technology, Daejeon (KR)

( * ) Notice: Subject to any disclaimer, the term of this patent is extended or adjusted under 35 U.S.C. 154(b) by 505 days.

(21) Appl. No.: 17/061,301

(22) Filed: Oct. 1, 2020

(65) Prior Publication Data
US 2021/0101416 A1 Apr. 8, 2021

(30) Foreign Application Priority Data
Oct. 2, 2019 (KR) .......... 10-2019-0122313

(51) Int. Cl.
*B60C 11/24* (2006.01)
*B60C 19/00* (2006.01)
(Continued)

(52) U.S. Cl.
CPC ............ *B60C 11/246* (2013.01); *B60C 19/00* (2013.01); *B60Q 9/00* (2013.01); *G01M 17/02* (2013.01);
(Continued)

(58) Field of Classification Search
CPC ..................................... B60C 11/246
See application file for complete search history.

(56) References Cited

U.S. PATENT DOCUMENTS 8,061,191 B2  11/2011  Hanatsuka
8,483,976 B2   7/2013  Morinaga
(Continued)

*Primary Examiner* — Michael A Berns
(74) *Attorney, Agent, or Firm* — Knobbe, Martens, Olson & Bear, LLP

(57) ABSTRACT

Provided is a technique for measuring a wear rate of a tire tread using tendency of a peak value of acceleration of the tire. According to an embodiment of the present disclosure, a tire wear measuring apparatus includes: a signal receiver configured to measure acceleration inside the tire installed to a the vehicle for each point inside the tire; a signal analyzer configured to receive signal information from the signal receiver and estimate a tread wear rate of the tire using a peak value of acceleration in longitudinal direction perpendicular to an axial direction of the tire from among acceleration signals inside the tire; a transmitter configured to receive analysis information, which is information on the tread wear rate of the tire, from the signal analyzer and transmit the analysis information; and a control module configured to receive the analysis information from the transmitter and generate a control signal for the vehicle to which the tire is installed. A physical change thereof is verified using a Flexible Ring tire model which is a mathematical model.

6 Claims, 8 Drawing Sheets

(51) Int. Cl.
  *B60Q 9/00* (2006.01)
  *G01M 17/02* (2006.01)
  *G01P 15/00* (2006.01)

(52) U.S. Cl.
  CPC ........ *G01P 15/00* (2013.01); *B60C 2019/004* (2013.01)

(56) References Cited

U.S. PATENT DOCUMENTS

| | | | |
|---|---|---|---|
| 9,636,955 B2* | 5/2017 | Singh | G01K 13/08 |
| 9,821,611 B2* | 11/2017 | Singh | B60C 23/02 |
| 11,590,807 B2* | 2/2023 | Charreyron | B60C 11/246 |
| 2015/0360525 A1 | 12/2015 | Singh et al. | |
| 2017/0113495 A1 | 4/2017 | Singh et al. | |
| 2021/0101415 A1* | 4/2021 | Kim | B60C 11/243 |
| 2021/0101416 A1* | 4/2021 | Kim | G01M 17/02 |
| 2021/0101417 A1* | 4/2021 | Kim | G01M 17/02 |

* cited by examiner

TIRE WEAR MEASUREMENT DEVICE USING ACCELERATION PEAK VALUE OF TIRE AND TIRE WEAR MEASUREMENT METHOD USING SAME

CROSS-REFERENCE TO RELATED APPLICATIONS

This application claims priority to Korean Patent Application No. 10-2019-0122313 filed on Oct. 2, 2019, the disclosure of which including the specification, the drawings, and the claims is hereby incorporated by reference in its entirety.

BACKGROUND

Field

The present disclosure generally relates to tires, and more particularly to a tire wear measuring apparatus and a tire wear measuring method using the same.

Description of the Related Art

Among the components of a vehicle, tires are the only components contacting a road surface and are directly related to the vehicle's turning and braking performance. If tires are worn, the turning and braking performance may not be properly implemented. Thus, worn tires may be directly related to the vehicle's safety. Specifically, if a braking distance on a wet road surface increases due to the wear of the tire, it may directly lead to a vehicle accident.

Accordingly, research and development of a system which measures the wear rate of tire tread and the like in real time and automatically informs the replacement time of tires according to the wear rate of tires are being actively conducted.

In U.S. Patent Application Publication No. 2017-0113495 (Title: Indirect tire wear state estimation system), load of a vehicle is inferred and then a wear rate according to a distance travelled is estimated based on the load of the vehicle. However, it is inefficient since information on too many factors is required to estimate the wear rate. In addition, in U.S. Pat. No. 8,483,976 (Title: Method for estimating tire wear and apparatus for estimating tire wear) and U.S. Pat. No. 8,061,191 (Title: Method and apparatus for detecting wear of tire), a wear rate of a tire is measured by a method using sensing of a tire. However, it is difficult to expect consistent results. Further, actual vehicle operating conditions are not considered, resulting in a limitation in determining accurate tire wear under actual conditions.

SUMMARY

The present disclosure relates to a tire wear measuring apparatus using an acceleration peak value of a tire and a tire wear measuring method using the same, and more particularly, to a technique for measuring a wear rate of a tire tread using tendency of an acceleration peak value of a tire.

One object of one or more aspects of the present disclosure for solving the above problems is to measure an acceleration signal of a tire using an acceleration sensor, and to measure the wear amount of a tire tread by analyzing the acceleration signal.

The technical objects to be achieved by the present disclosure are not limited to as described-above, and other technical objects which are not described will be clearly understood by a person who has ordinary knowledge in a technical field to which the present disclosure pertains from the following description.

A configuration of the present invention for achieving the above objects includes: a signal receiver configured to measure acceleration inside a tire installed to a vehicle for each point inside the tire; a signal analyzer configured to receive signal information from the signal receiver and estimate a tread wear rate of the tire using a peak value of acceleration in longitudinal direction perpendicular to an axial direction of the tire from among acceleration signals inside the tire; a transmitter configured to receive analysis information, which is information on the tread wear rate of the tire, from the signal analyzer and transmit the analysis information; and a control module configured to receive the analysis information from the transmitter and generate a control signal for the vehicle to which the tire is installed. A peak value of acceleration may be acquired when the signal receiver measures acceleration of a grounding portion where the tire contacts a road surface.

In one embodiment of the present disclosure, the signal analyzer may be configured to apply the peak value of acceleration to the following equation acquired through normalization, which excludes influence of speed, load, and pressure of the tire, to derive a tread thickness of the tire, thereby estimating and calculating a tread wear rate of the tire.

$$f_h(h) = \frac{Acc_x}{\Omega^2 \theta_r^a}$$

In another embodiment of the present disclosure, data on a, which is the unique constant value for the tire, may be preset and stored in the signal analyzer.

In yet another embodiment of the present disclosure, the control module may include a vehicle controller configured to control the vehicle and an information transmitter configured to receive the analysis information from the transmitter and transmit the analysis information to the vehicle controller. The vehicle controller may be further configured to determine a replacement time of the tire using the analysis information.

In further embodiment of the present disclosure, the control module may further include a display configured to display the replacement time of the tire or information on a service of replacing the tire.

A configuration of the present invention for achieving the above objects includes: a first step in which the acceleration inside the tire in the axial direction is measured for each point inside the tire; a second step in which a tread wear rate of the tire is estimated using a peak value of acceleration in longitudinal direction perpendicular to an axial direction, which is a radial direction of the tire, among acceleration signals inside the tire; a third step in which a replacement time of the tire is determined using information on the tread wear rate of the tire; and a fourth step in which information on the replacement time of the tire is transmitted to a user of the vehicle and an external integrated control system connected to the vehicle.

BRIEF DESCRIPTION OF THE DRAWINGS

Hereinafter, the present disclosure will be described with reference to the accompanying drawings. However, the present disclosure can be implemented in various different forms and is not limited to the embodiments described herein. To clearly describe the present disclosure, parts irrelevant to the description will be omitted in the drawings, and like elements will be designated by like numerals throughout the specification.

DETAILED DESCRIPTION

In this specification, when a part is referred to as being "connected" to another part, it may not only be "directly connected" but also may be "electrically connected" to the other part via an element disposed therebetween. Also, when a part is referred to as "including" an element, this means that the part does not exclude another element and may further include another element unless stated otherwise.

The terminology used herein is merely for the purpose of describing particular embodiments and is not intended to limit the invention. A singular form is intended to include a plural form as well, unless the context clearly indicates otherwise. It will be further understood that the terms "comprises" and/or "comprising," when used in this specification, specify the presence of stated features, integers, steps, operations, elements, components, and/or combinations thereof but do not preclude the presence or addition of one or more other features, integers, steps, operations, elements, components, and/or combinations thereof.

Hereinafter, the present disclosure will be described in detail with reference to the accompanying drawings.

Figure 1:
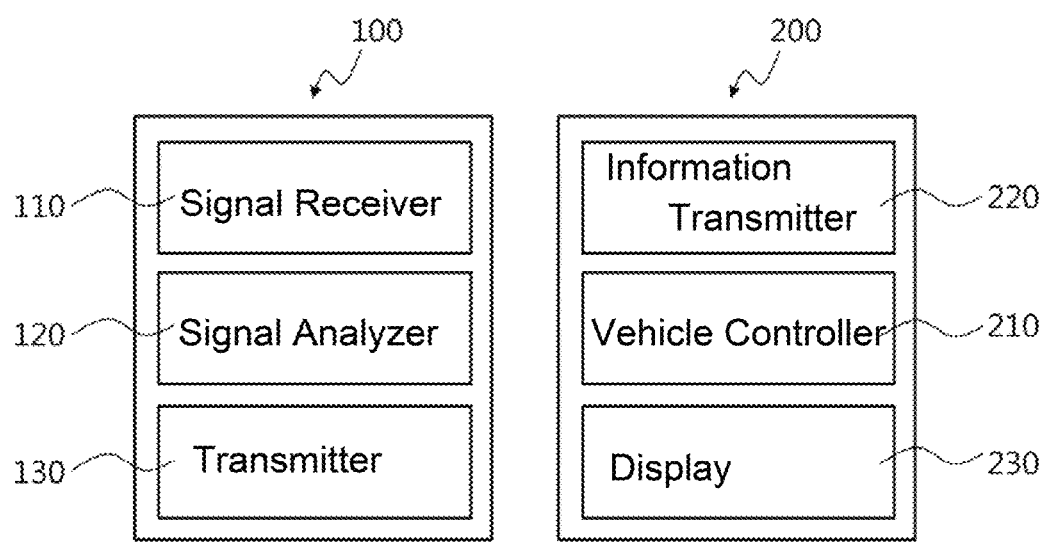
FIG. 1 is a schematic diagram of a configuration of a tire wear measuring apparatus according to an embodiment of the present disclosure.

FIG. 1 is a schematic diagram of a configuration of a tire wear measuring apparatus according to an embodiment of the present disclosure. As shown in FIG. 1, a tire wear measuring apparatus includes: a signal receiver 110 for measuring acceleration inside a tire installed on a vehicle for each of a plurality of points inside the tire; a signal analyzer 120 for receiving signal information from the signal receiver 110 and estimating a tread wear rate of the tire using a peak value of acceleration in longitudinal direction perpendicular to an axial direction, which is the radial direction of the tire, among acceleration signals inside the tire; a transmitter 130 for receiving analysis information, which is information on the tread wear rate of the tire, from the signal analyzer 120 and transmitting the analysis information; and a control module 200 for receiving the analysis information from the transmitter 130 and generating a control signal for the vehicle to which a tire is installed. The peak value of acceleration may be acquired when the signal receiver 110 measures acceleration of a grounding portion where the tire contacts a road surface.

Here, a measurement module 100 may be formed by combining the signal receiver 110, the signal analyzer 120, and the transmitter 130, and the measurement module 100 may be formed by being connected to each tire installed to the vehicle or may be formed by being connected to every tire installed to the vehicle.

In addition, the control module 200 includes a vehicle controller 210 for controlling a vehicle and an information transmitter 220 for receiving analysis information from the transmitter 130 and transmitting the received analysis information to the vehicle controller 210, and the vehicle controller 210 may determine a tire replacement time using the analysis information. In addition, the control module 200 may further include a display 230 for displaying a tire replacement time or information on a service of replacing the tire.

The signal receiver 110 may include a plurality of acceleration sensors, and each of the plurality of acceleration sensors may measure acceleration in an axial direction of each of a plurality of points inside a tire tread. Further, a number may be sequentially assigned to each acceleration sensor, and accordingly, measurement signals measured by the respective acceleration sensors may be sequentially collected and converted into data. In addition, in response to receiving analysis information, the transmitter 130 may transmit the analysis information to the information transmitter 220 of the control module 200 wirelessly or by wire. To this end, the information transmitter 220 may be connected to the transmitter 130 wirelessly or by wire.

The vehicle controller 210 may be wirelessly connected to an integrated control system outside the vehicle while controlling the vehicle. In the vehicle controller 210, replacement time information, which is information on a scheduled tire replacement time according to a tire wear rate, may be stored in advance, and the vehicle controller 210 may compare the replacement time information with the tire wear rate in real time to determine information on a remaining time for tire replacement, the tire replacement time, and the like. In addition, the vehicle controller 210 may transmit the information on the remaining tile for tire replacement, the tire replacement time, and the like to the integrated control system. Using the information transmitted from the vehicle controller 210, the integrated control system may transmit, to the vehicle controller 210, information on a tire replacement service such as a quantity of tires stocked at a replacement time of a tire installed to the vehicle, a tire replacement repair center, and the like. The vehicle controller 210 may transmit the information on the tire replacement service to the display 230, and such information may be displayed on the display 230. In addition, even the information on the remaining time for tire replacement and the tire replacement time, which is generated by the vehicle controller 210, may also be displayed on the display 230 and informed to a user.

Hereinafter, a process of deriving an equation for estimating a tread wear rate of a tire by the signal analyzer 120 will be described.

Figure 2:
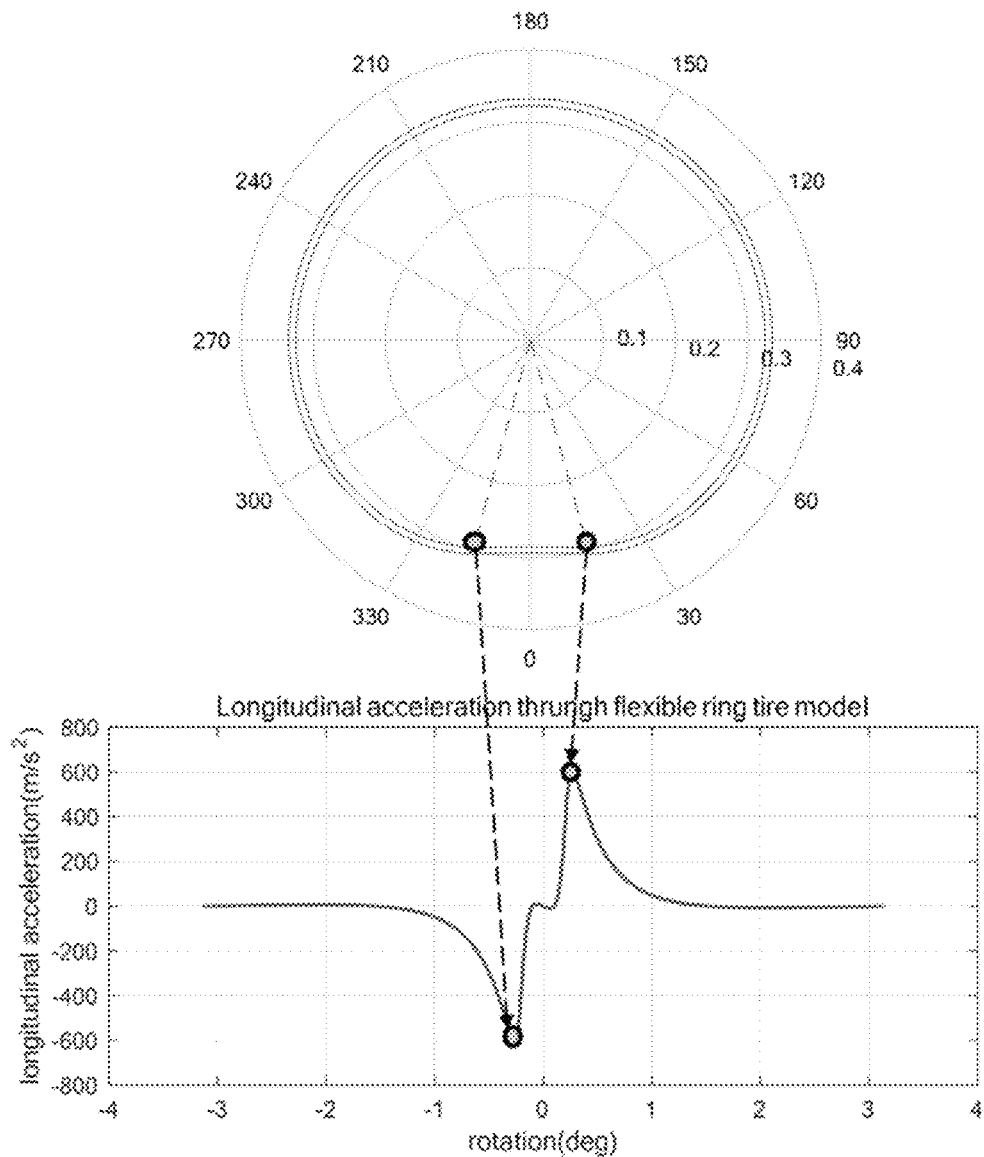
FIG. 2 is a schematic diagram of a shape of a tire when contacting a road surface and a graph of an acceleration signal according to an embodiment of the present disclosure.

FIG. 2 is a schematic diagram of a shape of a tire when contacting a road surface and a graph of an acceleration signal according to an embodiment of the present disclosure. Specifically, in FIG. 2, an upper schematic diagram illustrates a deformed tire, and a lower schematic diagram is a graph of an acceleration signal generated by rotation of the tire. As shown in FIG. 2, a longitudinal acceleration signal may form a peak value at both ends of a grounding portion of the tire in contact with a road surface. That is, it can be said that such a peak value of longitudinal acceleration reflects grounding characteristics of the tire and the road surface and property characteristics of the tire near the grounding.

As described above, since the acceleration sensor is formed at each point inside the tread of the tire to measure the acceleration signal of the tire and the tire wear measuring apparatus of the present disclosure uses a peak value of acceleration, the signal analyzer 120 may use an acceleration signal transmitted from an acceleration sensor formed adjacent to a grounding portion of the tire with respect to a road surface among acceleration signals received from the signal receiver 110 or may use an acceleration signal received from an acceleration sensor which generates a greatest signal among acceleration sensors formed adjacent to the grounding portion of the tire with respect to the road surface.

It is possible to analyze a change in tendency of a peak value of longitudinal acceleration of a tire according to an increase in wear rate of the tire based on two changes in condition of the tires that appear according to the wear of the tires. A first change in condition of a tire due to wear of the tire may be a change in bending stiffness of the tire. As the wear of the tire increases, a tread thickness of the tire decreases, and accordingly, the bending stiffness of the tire may decrease. The decrease in the tread bending stiffness of the tire due to the wear of the tire may cause a greater deformation of the tire at a grounding portion (area) of the tire.

Figure 3:
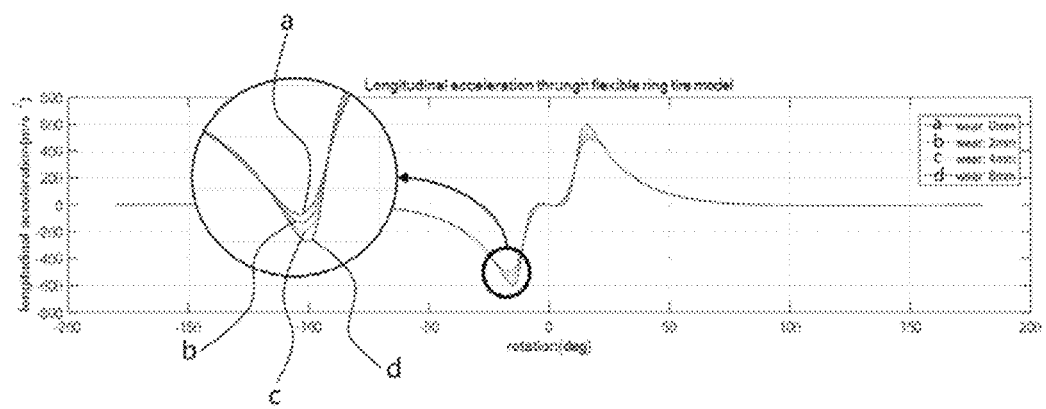
FIG. 3 is a graph comparing a change in peak value of an acceleration signal of a tire according to a tread wear amount (mm) of the tire according to an embodiment of the present disclosure.

FIG. 3 is a graph for comparing a change in peak value of an acceleration signal of a tire according to a tread wear amount (mm) of the tire according to an embodiment of the present disclosure. In FIG. 3, the horizontal axis represents rotation (deg) of the tire, and the vertical axis represents longitudinal acceleration. Specifically, FIG. 3 is a graph regarding an acceleration signal generated upon rotation of a tire through a Flexible Ring tire model, and a change in acceleration signal peak value according to a tread wear amount of each tire may be compared using the graph. At this point, analysis of the Flexible Ring tire model may be performed using a computer programs such as Python or Matlab, etc., and the analysis of the Flexible Ring tire model may be performed through simulation using the computer program. In addition, the trend of a mathematical model may be verified using a FEM program such as ANSYS, NASTRAN, and ABAQUS. Hereafter, it is the same.

In FIG. 3, graph a is a graph for a case where there is no tread wear amount of a tire, graph b is a graph for a case where a tread wear amount of the tire is 2 mm, graph c is a graph for a case where a tread wear amount of the tire is 4 mm, and graph d is a graph for a case where a tread wear amount of the tire is 6 mm. As shown in FIG. 3, it can be seen that as wear of the tire progresses, bending stiffness of the tire decreases, and as a result, deformation increases at a grounding portion of the tire. This may mean that a change in curvature occurs at both ends of the grounding portion of the tire.

In conclusion, as tread wear of the tire increases, a longitudinal acceleration signal peak value may increase at both ends of the grounding portion of the tire with respect to a road surface. Such a decrease in bending stiffness due to wear of the tire may cause a greater deformation of the tire at the grounding portion of the tire, which may mean that the change in curvature at both ends of the grounding portion of the tire is increased. As the wear of the tire increases, a longitudinal acceleration signal at both ends of the grounding portion, that is, a peak value of longitudinal acceleration may increase.

Further, on the other hand, in the case of the second change in condition of a tire, as wear of the tire increases, a tread mass of the tire decreases, and a tread stiffness of the tire may increase. In addition, as the tread stiffness of the tire increases, a tread natural frequency of the tire may increase. In addition, when the tire is rotating, the road surface which has been in contact with the grounding portion of the tire may be momentarily released from the contact. At this point, assuming that the tread of the tire is a mass-spring damper system in a simple shape, there is a tendency that as a natural frequency of the system increases, an instant acceleration increases. Thus, as the tread wear of the tire progresses, the tread natural frequency of the tire may increase and, as a result, a longitudinal acceleration signal value at both ends of the grounding portion of the tire may increase. This is clear from the result in FIG. 3. As shown in FIG. 3, as a result of comparing the peak value of longitudinal acceleration signal according to a wear of the tire through Flexible Ring tire model, it can be found that the peak value of longitudinal acceleration of the tire increases as the wear of the tire increases.

However, even if the peak value of acceleration changes according to the progress of the wear of the tire as described above, there are many limitations in using the peak value of longitudinal acceleration as a factor for estimating the wear of the tire.

Figure 4:
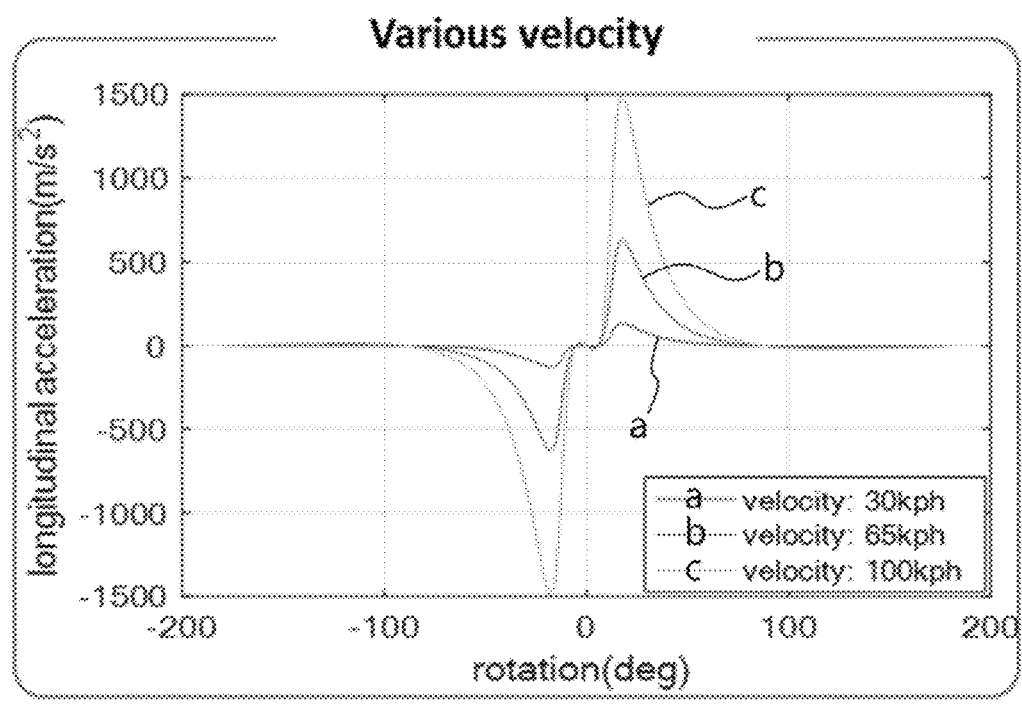
FIGS. 4 to 6 are graphs comparing a change in peak value of acceleration of a tire according to a change in speed, load, and pressure, respectively, of the tire according to an embodiment of the present disclosure.
Figure 5:
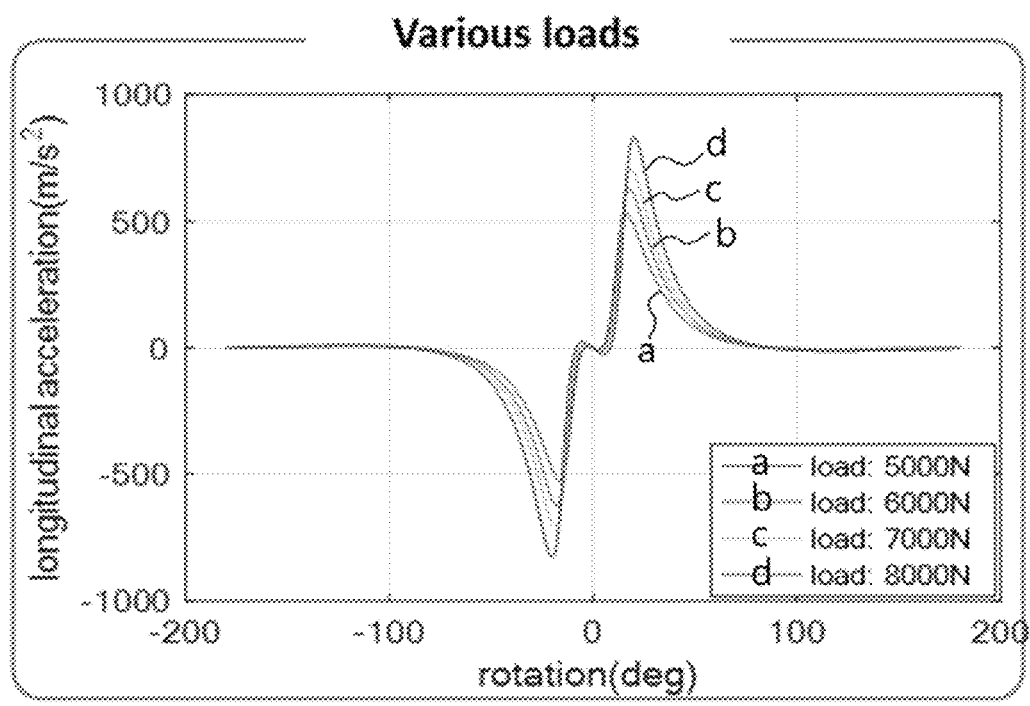
Figure 6:
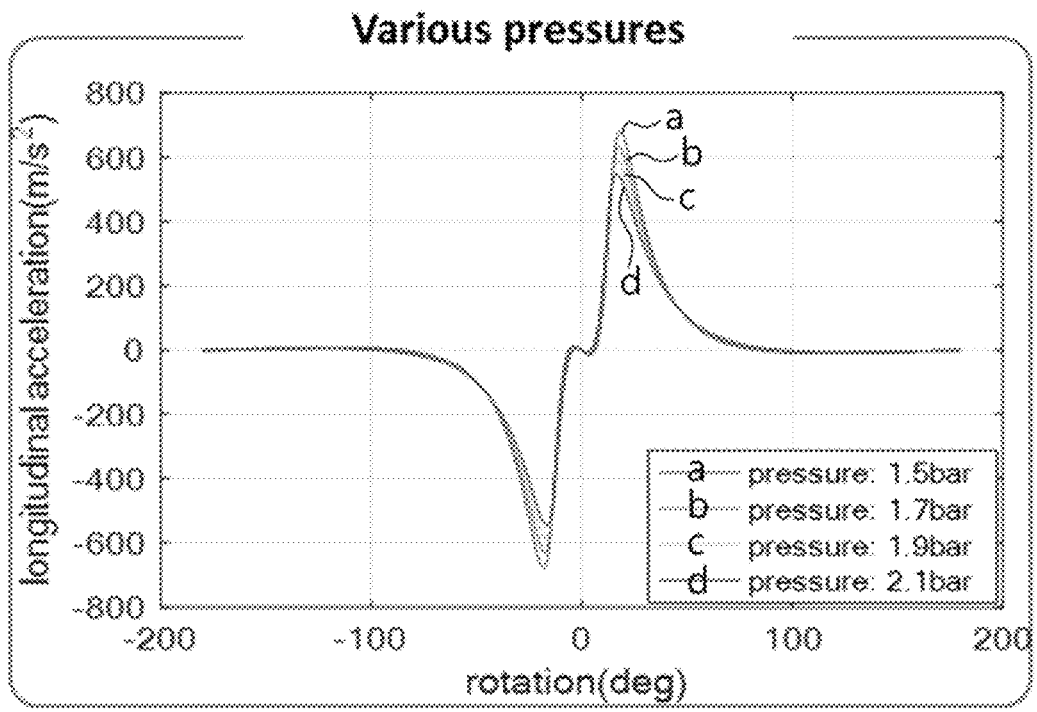

FIGS. 4 to 6 are graphs comparing a change in peak value of acceleration of a tire according to a change in speed, load, and pressure of the tire, respectively, according to an embodiment of the present disclosure. In FIGS. 4 to 6, the horizontal axis represents rotation (deg) of a tire, and the vertical axis represents longitudinal acceleration. Specifically, FIG. 4 is a graph showing a change in peak values of acceleration of a tire according to a change in speed of the tire. In FIG. 4, graph a is a graph for a case where the speed of the tire is 30 km/h (kph), graph b is a graph for a case where the speed of the tire is 65 km/h (kph), and graph c is a graph for a case where the speed of the tire is 100 km/h (kph).

In addition, FIG. 5 is a graph showing a change in peak values of acceleration of a tire according to a change in load of the tire. In FIG. 5, graph a is a graph for a case where the load of the tire is 5000N, graph b is a graph for a case where the load of the tire is 6000N, the graph c is a graph for a case where the load of the tire is 7000N, and graph d is a graph for a case where the load of the tire is 8000N.

In addition, FIG. 6 is a graph showing a change in peak values of acceleration of a tire according to a change in pressure of the tire. In FIG. 6, graph a is a graph for a case where the load of the tire is 1.5 bar, graph b is a graph for a case where the load of the tire is 1.7 bar, graph c is a graph for a case where the load of the tire is 1.9 bar, and graph d is a graph for a case where the load of the tire is 2.1 bar.

As shown in FIGS. 4 to 6, since the peak value of longitudinal acceleration in the tire is greatly affected by the speed, load, and pressure of the tire, according to some embodiments, the influence of the speed, load, and pressure of the tire may be advantageously be removed in order to check predominantly the influence of the wear of the tire on the peak value of acceleration.

Accordingly, without being bound to any theory, the peak value of longitudinal acceleration of the tire may be determined as a signal characteristic according to wear of the tire by removing the influence of the speed, load, or pressure of the tire based on the Flexible Ring tire model. The following [Equation 1] may express the peak value of longitudinal acceleration of the tire.

$$Acc_x = f_0(\Omega, F_z, p_0, h) \quad \text{[Equation 1]}$$

Here, $Acc_x$ is a peak value of acceleration, h is a tread thickness of the tire, f is an angular velocity of the tire, $p_0$ is pressure of the tire, and $F_z$ is load of the tire. Hereinafter, it is the same.

In [Equation 1], normalization of an angular velocity (velocity) may be performed for peak values of the same longitudinal acceleration, and theoretically, longitudinal acceleration based on the Flexible Ring tire model may be expressed as [Equation 2].

$$\ddot{v} = \frac{d^2v}{dt^2} = \frac{d\theta}{dt}\frac{d^2v}{d\theta dt} = \left(\frac{d\theta}{dt}\right)^2 \frac{d^2v}{d\theta^2} = \Omega^2 v'' \quad \text{[Equation 2]}$$

Here, v may be an amount of change in a longitudinal distance vector of a tire.

In addition, assuming that there is no damping effect due to rotational resistance inside the tire in the Flexible Ring tire model, the longitudinal acceleration of the tire may have a constant value even if the angular velocity of the tire changes. Accordingly, the peak value of longitudinal acceleration of the tire may be expressed as [Equation 3].

$$Acc_x = f_0(\Omega, F_z, p_0, h) = \Omega^2 f_1(F_z, p_0, h) \quad \text{[Equation 3]}$$

Here, the coefficients and characters represent the same as the coefficients and characters used in the above equations.

In addition, it is possible to more simply define [Equation 3] using three assumptions, and the three assumptions may be as follows.

Assumption 1: ($F_z$, $p_0$) and $h_0$ are independent.
Assumption 2: $f_2(F_z, p_0) = f_\theta(\theta_r)$
Assumption 3: $f_\theta(\theta_r) = C\theta_r^\alpha$ That is, load $F_z$ and pressure $p_0$ of the tire and an initial tread thickness $h_0$ of the tire are defined as independent variables (Assumption 1); a function $f_2$ ($F_z$, $p_0$) of the load $F_z$ and pressure $p_0$ of the tire is replaced with a function $f_\theta(\theta_r)$ of an angular velocity $\theta_r$ of the tire (Assumption 2), and a function $f_\theta(\theta_r)$ of angular velocity $\theta_r$ of the tire may be defined as a function $C\theta_r^\alpha$. Here, α is a unique constant value for the tire and C is a constant value. Hereafter, it is the same.

As a result, [Equation 3] may be expressed as [Equation 4] below.

$$Acc_x = \Omega^2 \theta_r^\alpha f_h(h) \quad \text{[Equation 4]}$$

In order to verify [Equation 4] which is an equation for longitudinal acceleration of a tire expressed relatively simply by the above assumptions, a simulation using a Flexible Ring tire model is performed. At this time, the influence of the tire speed on the peak value of longitudinal acceleration of the tire is removed from an influence map as shown in [Equation 4]. As an actual acceleration signal by an acceleration sensor installed at the tire may also be found, after fixing the speed at 65 km/h, a simulation is conducted for conditions in which a wear amount (0-6 mm), pressure (1.5 bar-2.1 bar), and load (5000-8000N) of the tire change. The unique constant value α can be obtained a general-purpose device known in the art to evaluate tire characteristics. For example, with the above described condition, "α" became 4.49 as shown in FIG. 7.

Figure 7:
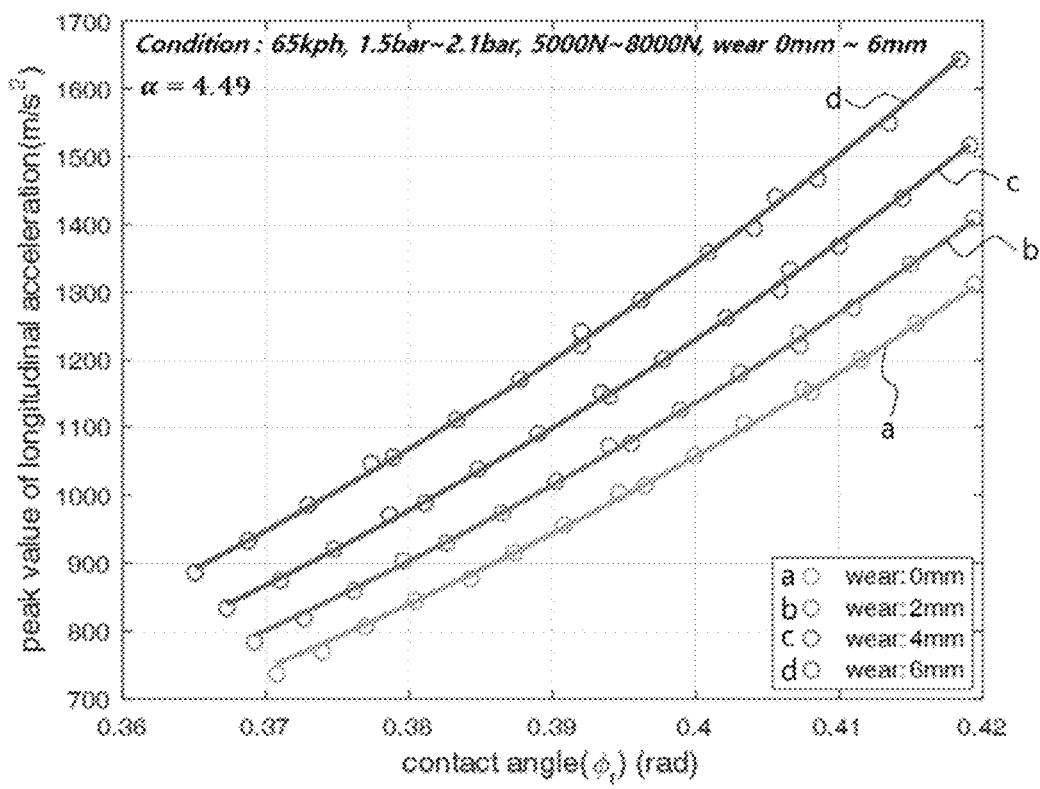
FIG. 7 is a graph showing a result of curve-fitting a peak value of longitudinal acceleration of a tire according to an embodiment of the present disclosure.

FIG. 7 is a graph showing a result of curve-fitting a peak value of longitudinal acceleration of a tire according to an embodiment of the present disclosure. In FIG. 7, graph a is a graph for a condition in which the wear amount of the tire is set to 0 mm and the pressure and load of the tire change; graph b is a graph for a condition in which the wear amount of the tire is set to 2 mm and the pressure and load of the tire change; graph c is a graph for a condition in which the wear amount of the is set to 4 mm and the pressure and load of the tire change; and graph d is a graph for a condition in which the wear amount of the tire is set to 6 mm and the pressure and load of the tire change. Here, the horizontal axis (x-axis) represents a contact angle of an end of a grounding portion of the tire, and the vertical axis (y-axis) represents a peak value of longitudinal acceleration of the tire.

Finally, if curve-fitting of a peak value of longitudinal acceleration value obtained through the above simulation is performed by [Equation 4], a result thereof may be as shown in FIG. 7. In addition, it may be found that the peak value of longitudinal acceleration is well-fitting for all conditions. These results show that [Equation 4], which expresses a peak value of longitudinal acceleration, well describes an actual value. That is, it may be found that [Equation 4] assumed above is experimentally verified through a Flexible Ring tire model. The expression of the peak value of longitudinal acceleration as shown in [Equation 4] may be actively used to process the peak value of longitudinal acceleration measured using the acceleration sensor of the tire as a factor for estimating wear of the tire.

Figure 8:
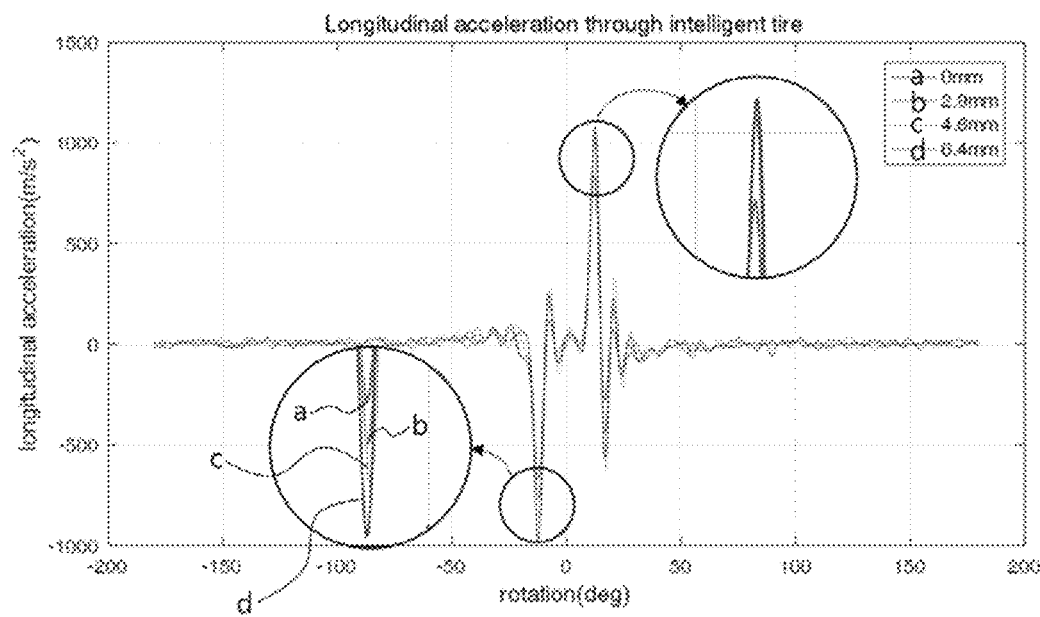
FIG. 8 is a graph for comparing of peak values of acceleration according to a wear amount of a tire according to an embodiment of the present disclosure.

FIG. 8 is a graph for comparing peak values of acceleration according to a wear amount of a tire according to an embodiment of the present disclosure. Specifically, FIG. 8 is a graph for comparing peak values of longitudinal acceleration according to a wear amount of a tire through an actual experiment. In FIG. 8, the horizontal axis represents rotation (deg) of the tire, and the vertical axis represents longitudinal acceleration. It is analyzed whether tendency of a peak value of longitudinal acceleration of a tire according to wear analyzed through Flexible Ring tire model is observed in an actual tire acceleration signal, and furthermore, a process for using the peak value of longitudinal acceleration of the tire as a factor for estimating wear of the tire is performed. As shown in FIG. 8, it may be found that, in actual data, the peak value of longitudinal acceleration measured using an actual tire according to wear of the tire tread has a great tendency with wear of the tire.

As shown in FIG. 8, the peak value of longitudinal acceleration of the tire may be affected by the speed, load, or pressure of the tire, similarly to the Flexible Ring tire model. Therefore, it may be necessary to remove such influence. Normalization, which is a necessary process, may be performed based on the following [Equation 5], and the peak value of longitudinal acceleration of the tire may be expressed as a function of an angular velocity Ω, a contact angle θr, and a thickness h of the tire. In other words, an equation such as [Equation 5] may be derived through an equation assumed from the above model.

$$f_h(h) = \frac{Acc_x}{\Omega^2 \theta_r^\alpha} \quad \text{[Equation 5]}$$

Here, $f_h(h)$ is a function in which factors for the speed, load, and pressure of the tire are removed from a tire acceleration signal function. The remaining coefficients and characters represent the same coefficients and characters used in the above equations.

If a value of a factor α determined according to a tire is known in [Equation 5], the tread thickness h of the tire, that is, a function related only to tire wear (left side) may be extracted. Then, the signal analyzer 120 may apply the peak value of acceleration to [Equation 5], which is obtained through normalization of removing influence of speed, load, and pressure of the tire, to derive the thickness of the tread of the tire, thereby calculating and estimating a tread wear rate of the tire. Specifically, the tread wear rate of the tire may be calculated and estimated by comparing and calculating a decrease in thickness of the tread of the tire and an initial thickness of the tread of the tire. In addition, data for α, which is a unique constant value for the tire, may be preset and stored in the signal analyzer 120.

Figure 9:
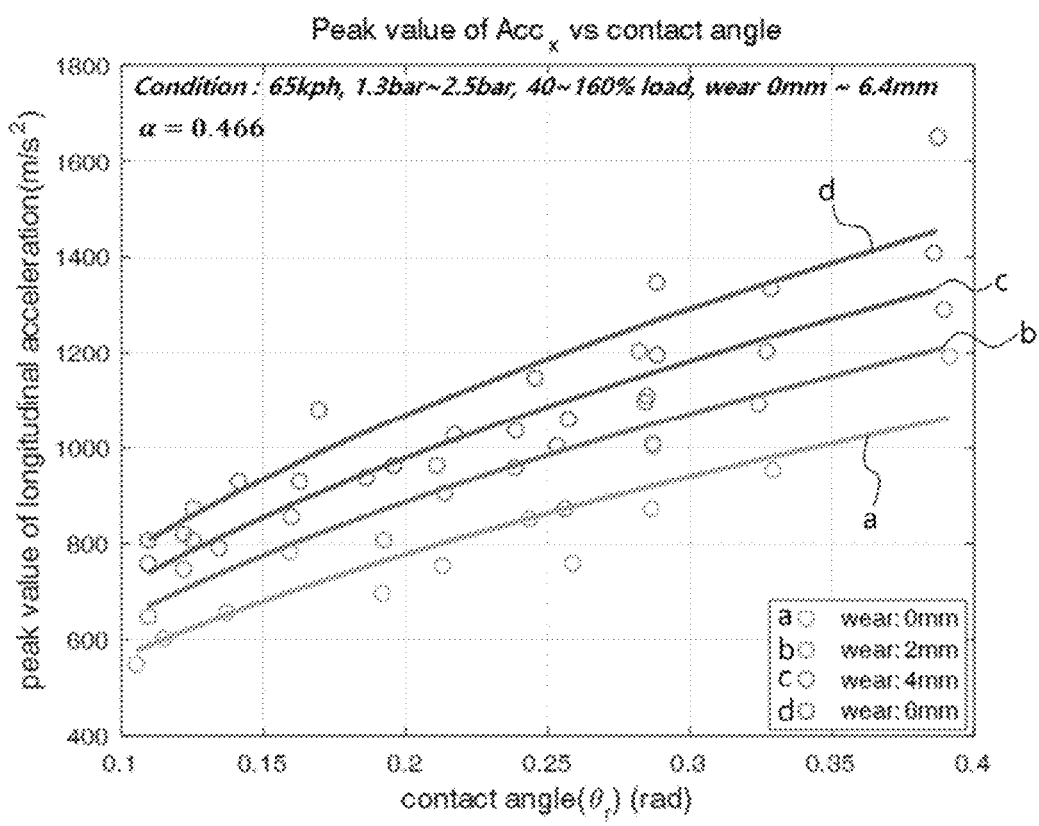
FIG. 9 is a graph showing a result of curve-fitting a peak value of acceleration by an actual signal obtained from an acceleration sensor according to an embodiment of the present disclosure.

FIG. 9 is a graph showing a result of curve-fitting a peak value of acceleration by an actual signal obtained from an acceleration sensor according to an embodiment of the present disclosure. A value of α may be derived using [Equation 5] based on an acceleration signal from an acceleration sensor of an actual tire. As described above, the value of α is set as the tire's unique factor and may be stored in advance in the signal analyzer 120.

Figure 10:
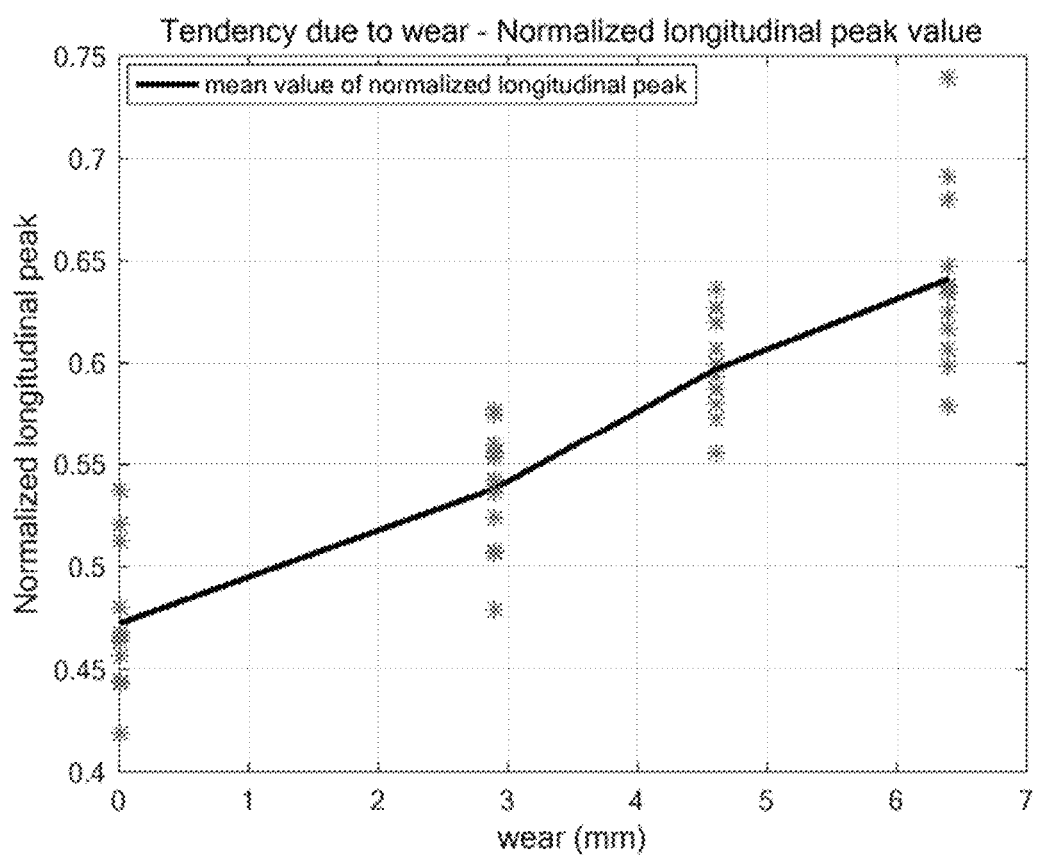
FIG. 10 is a graph showing tendency of a normalized peak value of acceleration according to tread wear of tire according to an embodiment of the present disclosure.
Figure 11:
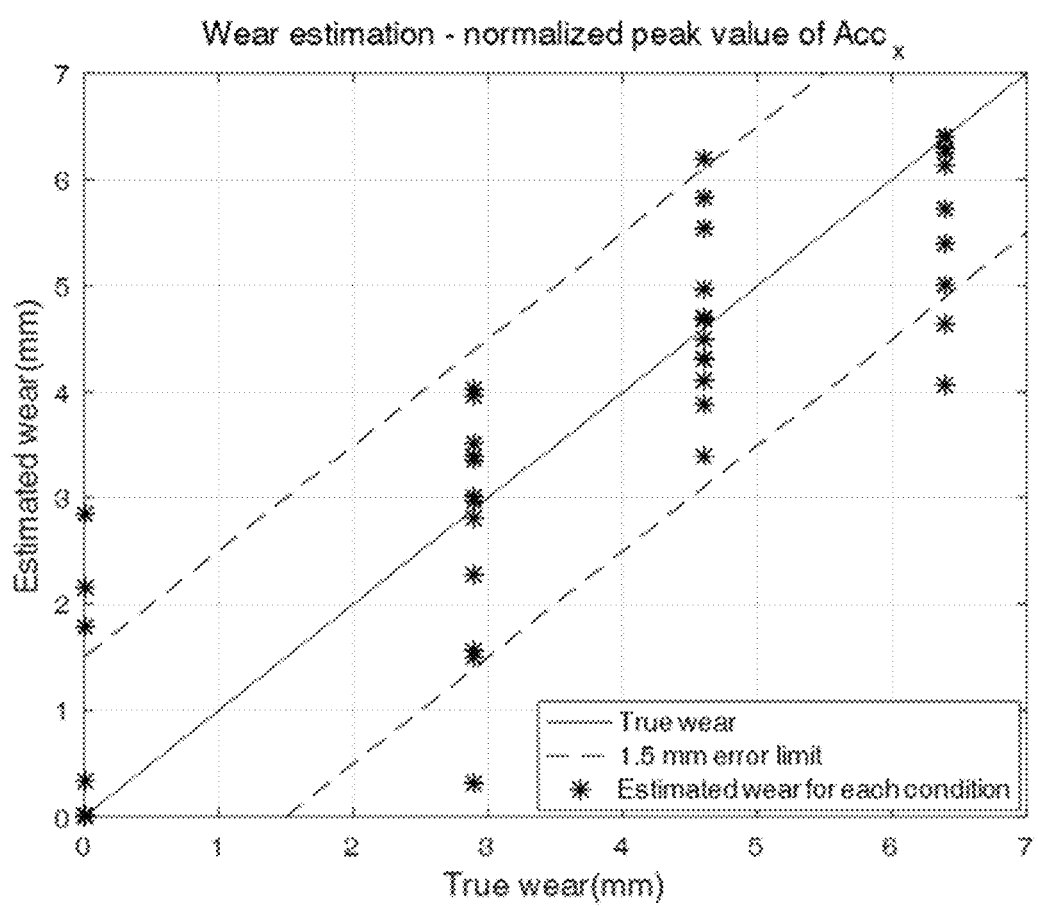
FIG. 11 is a graph comparing tendency of a peak value of acceleration and an actual wear amount of the tire according to an embodiment of the present disclosure.

FIG. 10 is a graph showing tendency of a normalized peak value of acceleration according to tread wear of tire according to an embodiment of the present disclosure, and FIG. 11 is a graph comparing tendency of a peak value of acceleration and an actual wear amount of the tire according to an embodiment of the present disclosure. In FIG. 10, the horizontal axis may represent an actual tread wear amount (mm) of the tire, and the vertical axis may represent a normalized longitudinal peak. In addition, in FIG. 11, the vertical axis may represent a wear amount (mm) calculated using the Flexible Ring tire model, and the horizontal axis may represent an actual amount of wear (mm) of the tire tread.

As shown in FIGS. 10 and 11, peak values of the newly defined and normalized longitudinal acceleration are applied/analyzed for various conditions. Specifically, while changing pressure, load, velocity, and the like of a tire, comparative analysis is conducted for a total of 12 conditions (3 load conditions×4 pressure conditions) for each tire wear stage. Here, each point shows the results of various conditions, and each solid line may be a graph formed by connecting the average value of each point for each amount of wear.

As shown in the results of FIGS. 10 and 11, it may be found that as the tread wear of the tire increases, the normalized peak value of longitudinal acceleration tends to continuously increase.

Through the above process, the peak value of longitudinal acceleration according to the wear of the tire is normalized, and the tendency of the peak value of acceleration according to the wear of the tire is analyzed. As a result, it is found that as the wear of the tire progresses, the normalized peak value of longitudinal acceleration tends to decrease both in the simulation and experiment.

Specifically, in the case where wear of the tire is estimated based on the normalized peak value of longitudinal acceleration and performance resulting therefrom is evaluated, when the wear of the tire is estimated based only on the normalized peak value of longitudinal acceleration, it is found that the same performance as in FIGS. 10 and 11 is achieved. The tendency of the normalized peak value of longitudinal acceleration shows a nearly constant slope regardless of a wear level of the tire tread, and thus, it is found that similar estimation performance is achieved at any wear level.

According to the above configuration, it is possible to measure an acceleration signal of a tire using an acceleration sensor, extract a peak value of acceleration of the tire from the acceleration signal, and estimate a tread wear rate of the tire by analyzing the peak value, and therefore, a wear amount of the tire may be measured in real time. In addition, it is possible to share information on the wear amount of the tire not only with a vehicle user but also with an integrated control system, and therefore, an automatic service for replacement of the tire may be implemented.

Hereinafter, a method for measuring wear of the tire using a tire wear apparatus of the present disclosure will be described.

In a first step, acceleration inside a tire with respect to an axial direction may be measured for each point inside the tire. In a second step, a tread wear rate of the tire may be estimated by using a peak value of acceleration in longitudinal direction perpendicular to the axial direction, which is the radial direction of the tire, among acceleration signals inside the tire. Next, in a third step, a replacement time of the tire may be determined using information on the tread wear rate of the tire. Then, in a fourth step, information on the replacement time of the tire may be transmitted to a user of the vehicle and an external integrated control system connected to the vehicle.

A description on what is not described in relation to the tire wear measuring method using the tire wear measuring apparatus of the present disclosure may be the same as the above description about the tire wear measuring apparatus of the present disclosure.

The present disclosure according to the configuration as described above have advantageous effects that it is possible to measure an acceleration signal of the tire using an acceleration sensor, extract a peak value of acceleration of the tire from the acceleration signal, and estimate a tread wear rate of the tire through analysis of the peak value, thereby estimating a wear amount of the tire in real time.

In addition, as information on a wear amount of the tire is shared not only with a user of a vehicle but also with an integrated control system, it is possible to implement an automatic service for replacement of the tire.

The effects of the present disclosure are not limited to the above-mentioned effects, and it should be understood that the effects of the present disclosure include all effects that can be inferred from the configuration of the invention described in the detailed description of the invention or the appended claims.

The above description of the example embodiments is provided for the purpose of illustration, and it would be understood by those skilled in the art that various changes and modifications may be made without changing the technical conception and essential features of the embodiments. Thus, it is clear that the above-described embodiments are illustrative in all aspects and do not limit the present disclosure. It will be appreciated that each of the processes, methods, and algorithms such as modules, analyzers and controllers described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. In some embodiments, particular operations and methods may be performed by circuitry that is specific to a given function.

The scope of the inventive concept is defined by the following claims, and it shall be understood that all modifications and embodiments conceived from the meaning and scope of the claims and their equivalents are included in the scope of the present disclosure.

What is claimed is:

1. An apparatus for measuring tire wear using an acceleration peak value of a tire, the apparatus comprising:
    a signal receiver configured to measure an acceleration inside a tire installed on a vehicle at each of a plurality of points inside the tire;
    a signal analyzer configured to receive signal information from the signal receiver and estimate a tread wear rate of the tire using a peak value of the acceleration in a longitudinal direction perpendicular to an axial direction of the tire;
    a transmitter configured to receive analysis information including information on the tread wear rate of the tire from the signal analyzer and transmit the analysis information; and
    a control module configured to receive the analysis information from the transmitter and generate a control signal for the vehicle on which the tire is installed,
    wherein the peak value of the acceleration is acquired when the signal receiver measures the acceleration of a grounding portion where the tire contacts a road surface.

2. The apparatus of claim 1,
    wherein the signal analyzer is configured to apply the peak value of acceleration to the following equation obtained through normalization, which excludes influence of speed, load, and pressure of the tire, to derive a tread thickness of the tire to estimate and calculate a tread wear rate of the tire:

$$f_h(h) = \frac{Acc_x}{\Omega^2 \theta_r^\alpha}$$

where $Acc_x$ is the peak value of the acceleration, h is the tread thickness of the tire, $\Omega$ is an angular velocity of the tire, $\theta_r$ is a contact angle between the tire and the road surface, $\alpha$ is a unique constant value for the tire, $f_h(h)$ is a function obtained by removing factors for the speed, load, and pressure of the tire from an acceleration signal function of the tire.

3. The apparatus of claim 2,
    wherein data on a, which is the unique constant value for the tire, is preset and stored in the signal analyzer.

4. The apparatus of claim 1, wherein the control module comprises:
    a vehicle controller configured to control the vehicle; and
    an information transmitter configured to receive the analysis information from the transmitter and transmit the analysis information to the vehicle controller,
    wherein the vehicle controller is configured to determine a replacement time of the tire using the analysis information.

5. The apparatus of claim 4,
    wherein the control module further comprises a display configured to display the replacement time of the tire or information on a service of replacing the tire.

6. A method of measuring wear of a tire using the apparatus of claim 1, comprising:
    measuring the acceleration inside the tire in the axial direction at each of the points inside the tire;
    estimating the tread wear rate of the tire using the peak value of the acceleration in the longitudinal direction;
    determining a replacement time of the tire using the information on the tread wear rate of the tire; and
    transmitting information on the replacement time of the tire to a user of the vehicle and an external integrated control system connected to the vehicle.

* * * * *